United States Patent
Choi et al.

(10) Patent No.: US 10,868,305 B2
(45) Date of Patent: Dec. 15, 2020

(54) COMPOSITE CATHODE ACTIVE MATERIAL, CATHODE AND LITHIUM BATTERY CONTAINING THE SAME, AND METHOD OF PREPARING THE COMPOSITE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Byungjin Choi, Seoul (KR); Byongyong Yu, Yongin-si (KR); Jinhwan Park, Seoul (KR); Jayhyok Song, Yongin-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 156 days.

(21) Appl. No.: 15/713,950

(22) Filed: Sep. 25, 2017

(65) Prior Publication Data

US 2018/0145322 A1 May 24, 2018

(30) Foreign Application Priority Data

Nov. 18, 2016 (KR) .................... 10-2016-0154444

(51) Int. Cl.
*H01M 4/525* (2010.01)
*H01M 4/505* (2010.01)
(Continued)

(52) U.S. Cl.
CPC ......... *H01M 4/525* (2013.01); *H01M 4/0471* (2013.01); *H01M 4/366* (2013.01);
(Continued)

(58) Field of Classification Search
CPC ...... H01M 4/525; H01M 4/505; H01M 4/366; H01M 4/131; H01M 4/485; H01M 4/1391
See application file for complete search history.

(56) References Cited

U.S. PATENT DOCUMENTS 9,525,173 B2  12/2016  Kagei et al.
9,543,571 B2  1/2017  Song et al.
(Continued)

FOREIGN PATENT DOCUMENTS

EP    2704236 A2    3/2014
EP    2963708 A1    1/2016
(Continued)

OTHER PUBLICATIONS

Extended European Search Report issued by the European Patent Office dated May 3, 2018 in the examination of the European Patent Application No. 17 198 377.8.

*Primary Examiner* — Imran Akram
(74) *Attorney, Agent, or Firm* — Cantor Colburn LLP

(57) ABSTRACT

A composite cathode active material includes a first cathode active material including a core including a first lithium transition metal oxide represented by Formula 1 and having a first layered crystalline phase that belongs to a R-3m space group; and a coating layer disposed on the core and including a second lithium transition metal oxide having a plurality of layered crystalline phases, wherein each layered crystalline phase of the plurality of layered crystalline phases has a different composition:

$$Li_aMO_2 \qquad \text{Formula 1}$$

wherein, in Formula 1, $1.0 \leq a \leq 1.03$; and
M includes nickel and an element including a Group 4 element to a Group 13 element other than nickel.

17 Claims, 10 Drawing Sheets

(51) Int. Cl.
  *H01M 4/04* (2006.01)
  *H01M 4/36* (2006.01)
  *H01M 10/052* (2010.01)
  *H01M 2/02* (2006.01)
  *H01M 4/02* (2006.01)

(52) U.S. Cl.
  CPC ............ *H01M 4/505* (2013.01); *H01M 2/022* (2013.01); *H01M 10/052* (2013.01); *H01M 2004/028* (2013.01)

(56) References Cited

U.S. PATENT DOCUMENTS

| | | |
|---|---|---|
| 9,660,259 B2 | 5/2017 | Oh et al. |
| 9,722,241 B2 | 8/2017 | Kim et al. |
| 2011/0052989 A1* | 3/2011 | Venkatachalam ............................ C01G 45/1257 429/221 |
| 2012/0282522 A1* | 11/2012 | Axelbaum ............ H01M 4/485 429/219 |
| 2014/0131633 A1* | 5/2014 | Ito ....................... C01G 45/1235 252/519.15 |
| 2015/0079463 A1* | 3/2015 | Yamamoto ............ H01M 4/505 429/188 |
| 2015/0171423 A1 | 6/2015 | Kim et al. |
| 2016/0006031 A1* | 1/2016 | Kaseda ................. H01M 4/131 429/223 |
| 2016/0064730 A1 | 3/2016 | Park et al. |
| 2016/0099469 A1 | 4/2016 | Paulsen et al. |
| 2016/0190559 A1 | 6/2016 | Hou et al. |
| 2016/0254539 A1* | 9/2016 | Kagei .................... C01G 53/50 252/182.1 |
| 2017/0294651 A1* | 10/2017 | Choi ........................ C01F 7/043 |
| 2017/0358797 A1* | 12/2017 | Son ....................... H01M 4/628 |

FOREIGN PATENT DOCUMENTS

| | | |
|---|---|---|
| JP | 5809772 B2 | 9/2015 |
| KR | 1020130033155 A | 4/2013 |
| KR | 101520166 B1 | 5/2015 |
| KR | 101568257 A | 11/2015 |
| KR | 1020150144613 A | 12/2015 |
| KR | 1020160025893 A | 3/2016 |
| KR | 1020160033225 A | 3/2016 |

* cited by examiner

US 10,868,305 B2

COMPOSITE CATHODE ACTIVE MATERIAL, CATHODE AND LITHIUM BATTERY CONTAINING THE SAME, AND METHOD OF PREPARING THE COMPOSITE CATHODE ACTIVE MATERIAL

CROSS-REFERENCE TO RELATED APPLICATION

This application claims priority to and the benefit of Korean Patent Application No. 10-2016-0154444, filed on Nov. 18, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode active material, a cathode and a lithium battery including the composite cathode active material, and a method of preparing the composite cathode active material.

2. Description of the Related Art

In order to manufacture various types of electronic devices having a small size and exhibiting high performance, it is desirable to utilize a lithium battery having a high energy density, a small size, and a light weight. That is, it is desirable to use a lithium battery having a high capacity.

A cathode active material having a high capacity has been examined to manufacture a lithium battery that corresponds to the use described above.

Therefore, a method of preventing deterioration of performance of a battery that includes a cathode active material having a high capacity while exhibiting a high capacity at a relatively low voltage is desired.

SUMMARY

Provided is a composite cathode active material capable of exhibiting a high capacity at a relatively low voltage and capable of preventing deterioration in the performance of a battery which includes the cathode active material.

Provided is a cathode including the composite cathode active material.

Provided is a lithium battery including the cathode.

Provided also is a method of preparing the composite cathode active material.

According to an aspect of an embodiment, a composite cathode active material includes a first cathode active material including, a core including a first lithium transition metal oxide represented by Formula 1 and having a first layered crystalline phase that belongs to a R-3m space group; and a coating layer disposed on the core and including a second lithium transition metal oxide having a plurality of layered crystalline phases, in which each layered crystalline phase of the plurality of layered crystalline phases has a different composition:

$$Li_aMO_2 \qquad \text{Formula 1}$$

wherein, in Formula 1, $1.0 \leq a \leq 1.03$; and M includes nickel  and an element including a Group 4 to a Group 13 element other than nickel.

According to an aspect of another embodiment, a cathode includes the composite cathode active material.

According to an aspect of another embodiment, a lithium battery includes the cathode.

According to an aspect of another embodiment, a method of preparing a composite cathode active material includes: preparing a first lithium transition metal oxide, which is represented by Formula 1 and formed of a first layered crystalline phase that belongs to a R-3m space group; mixing the first lithium transition metal oxide, a precursor of a second lithium transition metal oxide, and a lithium source to prepare a mixture; and heat-treating the mixture in an oxidation atmosphere to obtain a composite cathode active material:

$$Li_aMO_2 \qquad \text{Formula 1}$$

wherein, in Formula 1, 
$1.0 \leq a \leq 1.03$; and
M includes nickel and an element including a Group 4 to Group 13 element other than nickel.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
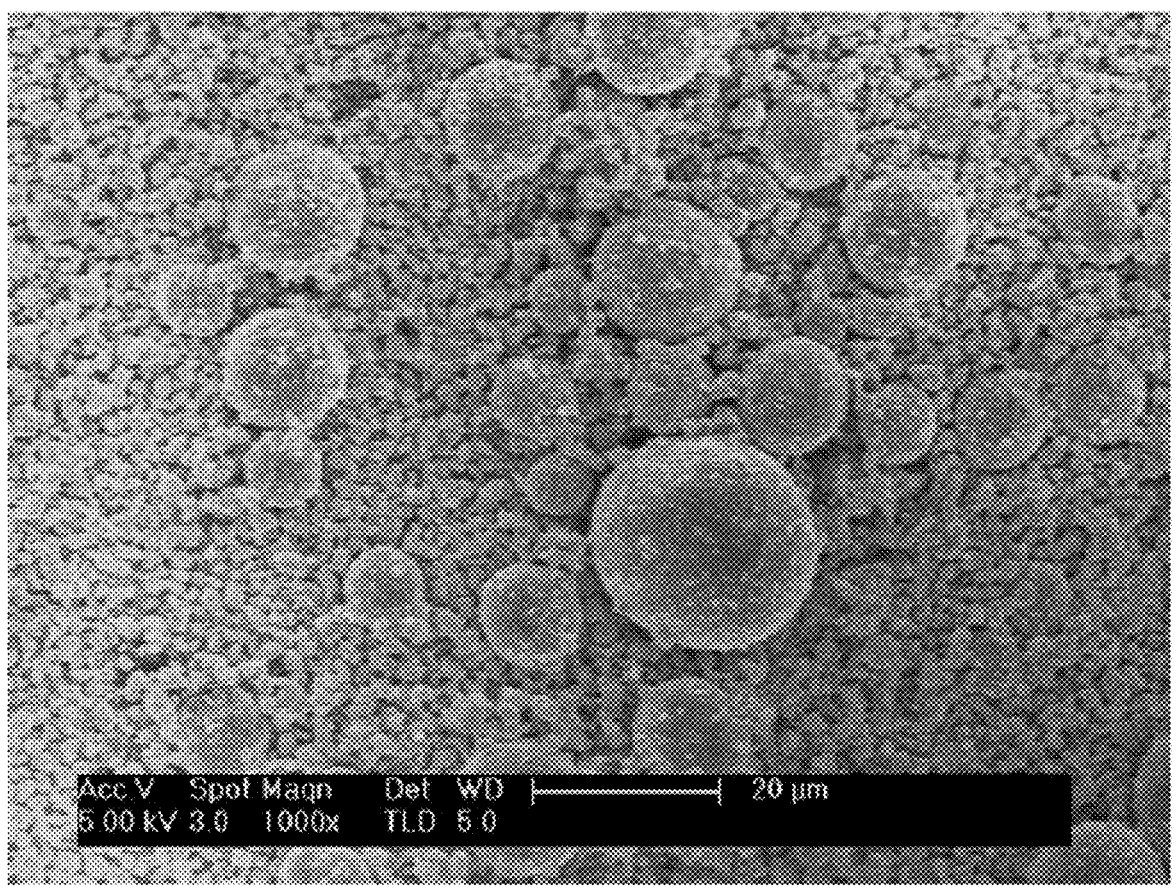
FIG. 1 is a scanning electron microscope (SEM) image of a surface of a composite cathode active material prepared in Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to exemplary embodiments, a composite cathode active material, a method of preparing the same, and a cathode and a lithium battery including the composite cathode active material will be described in detail.

According to an embodiment, a composite cathode active material includes a large-diameter (e.g., first) cathode active material including a core that includes a first lithium transition metal oxide represented by Formula 1 and having a first layered crystalline phase that belongs to a R-3m space group; and a coating layer disposed on the core and including a second lithium transition metal oxide having a plurality of layered crystalline phases, in which each layered crystalline phase of the plurality of layered crystalline phases has a different composition:

$$Li_aMO_2 \qquad \text{Formula 1}$$

In Formula 1, $1.0 \leq a \leq 1.03$; and M includes nickel and an element including a Group 4 to a Group 13 element other than nickel. That is, the element including a Group 4 to a Group 13 element other than nickel may include a Group 4 element, a Group 5 element, a Group 6 element, a Group 7 element, a Group 8 element, a Group 9 element, a Group 10 element, a Group 11 element, a Group 12 element, a Group 13 element, or a combination thereof, except for nickel.

A nickel-based cathode active material having a high capacity utilizes a high voltage to obtain a high discharge capacity. In this regard, the nickel-based cathode active material may have a deteriorated lifespan, and a decrease in the driving voltage of the lithium battery is significant as the number of charging/discharging cycles performed on the lithium battery increases.

When the composite cathode active material includes a core including a first lithium transition metal oxide and coating including a second lithium transition metal oxide which includes a plurality of crystalline phases, an amount of free (e.g., residual or unbound) lithium is reduced, and deterioration of the composite cathode active material is suppressed. In this regard, charge/discharge characteristics of a lithium battery including the composite cathode active material may be improved. For example, when the first lithium transition metal oxide and a precursor of the second lithium transition metal oxide are allowed to react, free lithium remaining on a surface of the first lithium transition metal oxide is used as a lithium source for the formation of the second lithium transition metal oxide, which thereby reduces a total amount of the free lithium in the composite cathode active material. Thus, the composite cathode active material having reduced amounts of free lithium is prepared, and a side reaction between the composite cathode active material and an electrolyte solution may be effectively suppressed. Also, it is possible to omit an additional process such as a washing process for removing the free lithium, and as a result, elution of a transition metal from the composite cathode active material which occurs during the washing process may be suppressed, and thus deterioration of the composite cathode active material may be prevented. Further, when the second lithium transition metal oxide including a plurality of crystalline phases is coated on a surface of the first lithium transition metal oxide, a side reaction between the first lithium transition metal oxide and an electrolyte solution may be effectively blocked.

In the composite cathode active material, in the first lithium transition metal oxide an amount of nickel is greater than an amount of the Group 4 to the Group 13 element other than nickel. When the amount of nickel in the first lithium transition metal oxide is greater than an amount of the Group 4 to the Group 13 element other than nickel, a high capacity may be manifested. Therefore, a lithium battery providing a high capacity may be manufactured.

For example, in the composite cathode active material, the first lithium transition metal oxide may be represented by Formula 2:

$$Li_aNi_bM2_cM3_dO_2 \qquad \text{Formula 2}$$

In Formula 2, $1.0 \leq a \leq 1.03$, $0.4 < b < 1.0$, $0 < c < 0.3$, $0 < d < 0.4$, and $b+c+d=1$; and M2 and M3 are different from each other and include manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof. For example, in Formula 2, $1.0 \leq a \leq 1.03$, $0.5 \leq b < 1.0$, $0 < c < 0.3$, and $0 < d < 0.4$. For example, in Formula 2, $1.0 \leq a \leq 1.03$, $0.6 \leq b < 1.0$, $0 < c < 0.3$, and $0 < d < 0.4$. For example, in Formula 2, $1.0 \leq a \leq 1.03$, $0.7 \leq b < 1.0$, $0 < c < 0.3$, and $0 < d < 0.4$. For example, in Formula 2, $1.0 \leq a \leq 1.03$, $0.8 \leq b < 1.0$, $0 < c < 0.2$, and $0 < d < 0.2$.

For example, in the composite cathode active material, the first lithium transition metal oxide may be represented by Formula 3:

$$Li_aNi_bCo_cMn_dO_2 \qquad \text{Formula 3}$$

In Formula 3, $1.0 \leq a \leq 1.03$, $0.4 < b < 1.0$, $0 < c < 0.3$, and $0 < d < 1.0.4$. For example, in Formula 3, $0.5 \leq b < 1.0$, $0 < c < 0.3$, and $0 < d < 0.4$. For example, in Formula 3, $1.0 \leq a \leq 1.03$, $0.6 \leq b < 1.0$, $0 < c < 0.3$, and $0 < d < 0.4$. For example, in Formula 3, $1.0 \leq a \leq 1.03$, $0.7 \leq b < 1.0$, $0 < c < 0.3$, and $0 < d < 0.4$. For example, in Formula 3, $1.0 \leq a \leq 1.03$, $0.8 \leq b < 1.0$, $0 < c < 0.2$, and $0 < d < 0.2$.

In the composite cathode active material, the second lithium transition metal oxide includes a plurality of layered crystalline phases, in which each layered crystalline phase of the plurality of layered crystalline phases has a different composition. For example, the second lithium transition metal oxide may include a second layered crystalline phase that belongs to a C2/m space group and a third layered crystalline phase that belongs to a R-3m space group. The second lithium transition metal oxide may be a composite of the second layered crystalline phase and the third layered crystalline phase.

The second layered crystalline phase that belongs to a C2/m space group may have a composition represented by Formula 4; and the third layered crystalline phase that belongs to a R-3m space group may have a composition represented by Formula 5:

$$Li_2MnO_3 \qquad \text{Formula 4}$$

$$LiMO_2 \qquad \text{Formula 5}$$

In Formulae 4 and 5, M includes at least two elements including nickel (Ni), manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof.

For example, the second lithium transition metal oxide may be represented by Formula 6:

$$aLi_2MnO_3 \cdot (1-a)LiMO_2 \qquad \text{Formula 6}$$

In Formula 6, $0.2 < a < 1$; and M includes at least two elements including nickel (Ni), manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof. For example, in Formula 6, $0.25 \leq a < 1$. For example, in Formula 6, $0.3 \leq a < 1$. For example, in Formula 6, $0.35 \leq a < 1$. For example, in Formula 6, $0.4 \leq a < 1$. For example, in Formula 6, $0.2 < a \leq 0.8$. For example, in Formula 6, $0.25 \leq a \leq 0.8$. For example, in Formula 6, $0.3 \leq a \leq 0.8$. For example, in Formula 6, $0.4 \leq a \leq 0.8$. For example, in Formula 6, $0.2 < a \leq 0.6$. For example, in Formula 6, $0.25 \leq a \leq 0.6$. For example, in Formula 6, $0.3 \leq a \leq 0.6$. For example, in Formula 6, $0.4 \leq a \leq 0.6$. For example, M may include nickel, cobalt, manganese, or a combination thereof.

In the composite cathode active material, the second lithium transition metal oxide substantially includes a Mn-rich phase or is a lithium transition metal oxide that includes a large amount of lithium. In the second lithium transition metal oxide, some of transition metal sites may be substituted with lithium.

In some embodiments, the second lithium transition metal oxide may be represented by Formula 7:

$$Li_xM4_yM5_zMn_wO_2 \qquad \text{Formula 7}$$

In Formula 7, $1.07 \leq x \leq 1.20$, $0.1 \leq y < 0.8$, $0 \leq z \leq 0.13$, $0.46 \leq w < 0.8$, and $0.80 \leq y+z+w \leq 0.93$; and M4 and M5 each independently include nickel (Ni), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof. For example, in Formula 7, $1.10 \leq x \leq 1.20$, $0.1 \leq y < 0.8$, $0 \leq z \leq 0.13$, $0.46 \leq w < 0.8$, and $0.80 \leq y+z+w \leq 0.90$. For example, in Formula 7, $0.1 \leq y < 0.8$, $0 \leq z \leq 0.13$, $0.46 \leq w < 0.8$, and $0.80 \leq y+z+w \leq 0.87$. For example, in Formula 7, $1.10 \leq x \leq 1.20$, $0.1 \leq y < 0.8$, $0 \leq z \leq 0.13$, $0.50 \leq w < 0.8$, and $0.80 \leq y+z+w \leq 0.90$. For example, in Formula 7, $1.13 \leq x \leq 1.20$, $0.1 \leq y < 0.8$, $0 \leq z \leq 0.13$, $0.50 \leq w < 0.8$, and $0.80 \leq y+z+w \leq 0.87$. For example, in Formula 7, $1.10 \leq x \leq 1.20$, $0.1 \leq y < 0.8$, $0 \leq z \leq 0.13$, $0.55 \leq w < 0.8$, and $0.80 \leq y+z+w \leq 0.90$. For example, in Formula 7, $1.13 \leq x \leq 1.20$, $0.1 \leq y < 0.8$, $0 \leq z \leq 0.13$, $0.55 \leq w < 0.8$, and $0.80 \leq y+z+w \leq 0.87$. For example, M4 and M5 may each be nickel and cobalt.

In the composite cathode active material, the coating layer including the second lithium transition metal oxide may coat a surface of the core. For example, the coating layer may coat a portion of the surface of the core or the entire (e.g., 100%) surface of the core. For example, in the composite cathode active material, the coating layer including the second lithium transition metal oxide may coat about 50% or less of the surface of the core. For example, in the composite cathode active material, the coating layer including the second lithium transition metal oxide may coat about 40% or less of the surface of the core. For example, in the composite cathode active material, the coating layer including the second lithium transition metal oxide may coat about 30% or less of the surface of the core. For example, in the composite cathode active material, the coating layer including the second lithium transition metal oxide may coat about 20% or less of surface of the core. For example, in the composite cathode active material, the coating layer including the second lithium transition metal oxide may coat about 10% or less surface of the of the core.

For example, in the composite cathode active material, the coating layer including the second lithium transition metal oxide may be a discontinuous coating on a surface of the core. More specifically, the coating layer may have a sea-island type structure on the surface of the core. For example, the second lithium transition metal oxide included in the coating layer may be discontinuously arranged as discrete islands on the surface of the core. For example, the coating may be disposed on the surface of the core in an arrangement such as that shown in FIG. 1.

An amount of free (e.g., residual or unbound) lithium remaining on a surface of the composite cathode active material may be less than 1500 parts per million (ppm), based on a total content of the composite cathode active material. The amount of free lithium is an amount of free lithium remaining on the composite cathode active material, and is calculated based upon amounts of $Li_2CO_3$ and LiOH. For example, an amount of free lithium remaining on the composite cathode active material may be 1450 ppm or less. For example, an amount of free lithium remaining on the composite cathode active material may be 1400 ppm or less. For example, an amount of free lithium remaining on the composite cathode active material may be 1350 ppm or less. For example, an amount of free lithium remaining on the composite cathode active material may be 1300 ppm or less. For example, an amount of free lithium remaining on the composite cathode active material may be 1250 ppm or less. For example, an amount of free lithium remaining on the composite cathode active material may be 1200 ppm or less. For example, an amount of free lithium remaining on the composite cathode active material may be 1180 ppm or less. As the amount of free lithium remaining on the composite cathode active material decreases, a side reaction between the composite cathode active material and an electrolyte solution is suppressed, and thus gas generation may also be suppressed.

In the composite cathode active material, an average particle diameter (D50) of the large-diameter cathode active material may be greater than 5 μm micrometers (μm), for example, in a range of about 10 μm to about 20 μm. As used herein, "average particle size" or "average particle diameter (D50)" refer to a particle diameter corresponding to 50% of the particles in a particle diameter distribution curve, in which particles are accumulated in the order of particle diameter from the smallest particle to the largest particle and a total number of accumulated particles is 100%. Average particle diameter may be measured by methods known to those of skill in the art, for example, with a particle size analyzer. For example, an average particle diameter (D50) of the large-diameter cathode active material may be in a range of about 10 μm to about 18 μm. For example, an average particle diameter (D50) of the large-diameter cathode active material may be in a range of about 10 μm to about 16 μm. For example, an average particle diameter (D50) of the large-diameter cathode active material may be in a range of about 10 μm to about 14 μm. When the average particle diameter (D50) of the large-diameter cathode active material is within these ranges, the composite cathode active material may have improved charge/discharge characteristics.

The composite cathode active material may further include a small-diameter cathode active material. That is, the composite cathode active material may be a mixture of the large-diameter (first) cathode active material and the small-diameter (second) cathode active material. Thus, the composite cathode active material may have a bimodal particle diameter distribution of the large-diameter cathode active material and the small-diameter cathode active material.

In the composite cathode active material, the small-diameter cathode active material may be the second lithium transition metal oxide having an average particle diameter (D50) of about 5 μm or less, for example, in a range of about 1 μm to about 5 μm. For example, an average particle diameter (D50) of the small-diameter cathode active material may be in a range of about 1 μm to about 4 μm. For example, an average particle diameter (D50) of the small-diameter cathode active material may be in a range of about 1 μm to about 3 μm. For example, an average particle diameter (D50) of the small diameter cathode active material may be in a range of about 1 μm to about 2 μm. When the average particle diameter (D50) of the small-diameter cathode active material is within these ranges, the composite cathode active material may have improved charge/discharge characteristics.

Therefore, the composite cathode active material may include the first lithium transition metal oxide having an average particle diameter (D50) in a range of about 10 μm to about 20 μm as the large-diameter cathode active material and the second lithium transition metal oxide having an average particle diameter (D50) in a range of about 1 μm to about 5 μm as the small-diameter cathode active material at the same time, and the coating layer disposed on a surface of the core of the first lithium transition metal oxide may also include the second lithium transition metal oxide.

In the composite cathode active material including the large-diameter cathode active material and the small-diameter cathode active material, a particle diameter ratio of the large-diameter cathode active material and the small-diameter cathode active material may be in a range of about 20:1 to about 2:1. For example, in the composite cathode active material, a particle diameter ratio of the large-diameter cathode active material and the small-diameter cathode active material may be in a range of about 15:1 to about 3:1. For example, in the composite cathode active material, a particle diameter ratio of the large-diameter cathode active material and the small-diameter cathode active material may be in a range of about 10:1 to about 4:1. For example, in the composite cathode active material, a particle diameter ratio of the large-diameter cathode active material and the small-diameter cathode active material may be in a range of about 10:1 to about 5:1.

In the composite cathode active material including the large-diameter cathode active material and the small-diameter cathode active material, an amount of the particle small-diameter cathode active material may be in a range of about 1 wt % to about 30 wt % based on the total weight of the composite cathode active material. For example, in the composite cathode active material, an amount of the particle small-diameter cathode active material may be in a range of about 3 wt % to about 25 wt % based on the total weight of the composite cathode active material. For example, in the composite cathode active material, an amount of the particle small-diameter cathode active material may be in a range of about 5 wt % to about 20 wt % based on the total weight of the composite cathode active material. For example, in the composite cathode active material, an amount of the particle small-diameter cathode active material may be in a range of about 7 wt % to about 15 wt % based on the total weight of the composite cathode active material. When the amount of the small-diameter cathode active material is within these ranges, the composite cathode active material may have improved charge/discharge characteristics.

The composite cathode active material may be compressed by pressing the composite cathode active material under a defined pressure for a defined period of time. For example, the composite cathode active material may be pressed at a pressure of 2.6 tons/cm$^2$ for a period of 30 s, after which the press density of the material may be measured. An energy density of the composite cathode active material may improve as the press density of the composite cathode active material increases. A press density of the composite cathode active material including the large-diameter cathode active material and the small-diameter cathode active material after pressing at a pressure of 2.6 tons/cm$^2$ for 30 seconds may be about 3.0 grams per cubic centimeter (g/cc) or greater. For example, a press density of the composite cathode active material including the large-diameter cathode active material and the small-diameter cathode active material after pressing at a pressure of 2.6 tons/cm$^2$ for 30 seconds may be about 3.10 g/cc or greater. For example, a press density of the composite cathode active material including the large-diameter cathode active material and the small-diameter cathode active material after pressing at a pressure of 2.6 tons/cm$^2$ for 30 seconds may be about 3.20 g/cc or greater. For example, a press density of the composite cathode active material including the large-diameter cathode active material and the small-diameter cathode active material after pressing at a pressure of 2.6 tons/cm$^2$ for 30 seconds may be about 3.30 g/cc or greater. For example, a press density of the composite cathode active material including the large-diameter cathode active material and the small-diameter cathode active material after pressing at a pressure of 2.6 tons/cm$^2$ for 30 seconds may be about 3.35 g/cc or greater.

According to another embodiment, a cathode may include the composite cathode active material.

First, a cathode is prepared. The composite cathode active material, a conducting agent, a binder, and a solvent are mixed together to prepare a cathode active material composition. The cathode active material composition may be directly coated on an aluminum current collector to prepare a cathode plate having a cathode active material layer. In some embodiments, the cathode active material composition may be cast on a separate support to form a cathode film, which may then be separated from the support and laminated on an aluminum current collector to prepare a cathode plate (or a cathode) having a cathode active material layer.

The conducting agent may include carbon black, graphite particulates, natural graphite, artificial graphite, acetylene black, or Ketjen black; carbon fibers; carbon nanotubes; a metal powder or metal fibers or metal tubes of copper, nickel, aluminum, or silver; or a conducting polymer such as a polyphenylene derivative, but embodiments are not limited thereto. Any material available as a conducting agent in the art may be used. A combination including at least one of the foregoing may be used.

Examples of the binder include a vinylidene fluoride/hexafluoropropylene copolymer, polyvinylidene fluoride (PVDF), polyacrylonitrile, polymethyl methacrylate, polytetrafluoroethylene (PTFE), a styrene butadiene rubber polymer, or a combination thereof, but embodiments are not limited thereto. Any material available as a binding agent in the art may be used. Examples of the solvent include N-methyl-pyrrolidone (NMP), acetone, water, or a combination thereof, but embodiments are not limited thereto. Any material available as a solvent in the art may be used.

In some embodiments, pores may be formed in the cathode plate by further including a plasticizing agent in the cathode active material composition.

The amounts of the composite cathode active material, the conducting agent, the binder, and the solvent may be in ranges that are suitable for use in lithium secondary batteries, and may be determined by those of skill in the art without undue experimentation. At least one of the conducting agent, the binder, and the solvent may be omitted according to the use and the structure of the lithium secondary battery.

The cathode may include a general cathode active material in addition to the composite cathode active material.

The general cathode active material is a lithium-containing metal oxide, which may be any material suitable for use as a cathode active material in the art. For example, in some embodiments, the cathode active material may be at least one of a composite oxide of lithium with a metal including Co, Mn, Ni, or a combination thereof. In some embodiments, the cathode active material may be a compound represented by one of the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J includes vanadium (V), chromium (Cr), manganese (Mn), cobalt (Co), nickel (Ni), copper (Cu), or a combination thereof.

The compounds listed above as cathode active materials may be uncoated or may have a surface coating layer (hereinafter, also referred to as "coating layer"). Alternatively, a mixture of a compound including without a coating layer and a compound having a coating layer may be used, the compounds including those compounds listed above. In some embodiments, the coating layer may include a compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods are well understood in the art, and thus a detailed description thereof is omitted.

According to another embodiment, a lithium battery may include a cathode including the composite cathode active material. The lithium battery may be prepared in the following manner.

First, a cathode is prepared by the cathode plate preparation method described above.

Next, an anode is prepared. The anode may be prepared in the same manner as the cathode, except that an anode active material is used instead of a composite cathode active material. Also, similar conducting agent, binder, and solvent used in the preparation of the cathode may be used in the preparation of an anode active material composition.

For example, an anode active material, a conducting agent, a binder, and a solvent are mixed together to prepare an anode active material composition. The anode active material composition may be directly coated on a copper current collector to prepare an anode plate. In some embodiments, the anode active material composition may be cast on a separate support to form an anode active material film, which may then be separated from the support and laminated on a copper current collector to prepare an anode plate (or an anode).

The anode active material is not limited and may be any material that is suitable for use in the art. Examples of the anode active material may include lithium metal, a metal that is alloyable with lithium, a transition metal oxide, a non-transition metal oxide, a carbonaceous material, or a combination thereof.

For example, the metal alloyable with lithium may include Si, Sn, Al, Ge, Pb, Bi, Sb, an Si—Y' alloy (where Y' is an alkali metal, an alkaline earth metal, a Group 13 element, a Group 14 element, a transition metal, a rare earth element, or a combination thereof, and is not Si), or an Sn—Y' alloy (where, Y' is an alkali metal, an alkaline earth metal, a Group 13 element, a Group 14 element, a transition metal, a rare earth element, or a combination thereof, and is not Sn). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide may include a lithium titanium oxide, a vanadium oxide, and a lithium vanadium oxide. A combination of the foregoing may also be used.

Examples of the non-transition metal oxide may include $SnO_2$ and $SiO_x$ (where, $0<x<2$). A combination of the foregoing may also be used The carbon-based material may be crystalline carbon, amorphous carbon, or a combination thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (carbon calcined at a low-temperature), hard carbon, mesophase pitch carbide, and calcined cokes. A combination of the foregoing may also be used Amounts of the anode active material, the conducting agent, the binder, and the solvent may be suitable for use in a lithium secondary battery may be used, and may be determined by a person of skill in the art without undue experimentation.

Next, a separator to be disposed between the cathode and the anode is prepared. The separator for the lithium battery is not limited may be any separator that is suitable for use in lithium batteries. In some embodiments, the separator may have low resistance to migration of ions in an electrolyte and have an excellent electrolyte-retaining ability. Examples of the separator are glass fiber, polyester, Teflon, polyethylene, polypropylene, PTFE, and a combination thereof, each of which may be a non-woven or woven fabric. For example, a rollable separator including polyethylene and/or polypropylene may be used for a lithium ion battery. A separator with a good organic electrolytic solution-retaining ability may be used for a lithium ion polymer battery. For example, the separator may be manufactured as described below.

In some embodiments, a polymer resin, a filler, and a solvent may be mixed together to prepare a separator composition. Then, the separator composition may be directly coated on an electrode, and dried to form the separator. In some embodiments, the separator composition may be cast on a support and then dried to form a separator film, which may then be separated from the support and laminated on an electrode to form the separator.

The polymer resin used to manufacture the separator is not limited and may be any material suitable for use as a binder for electrode plates. Examples of the polymer resin are a vinylidene fluoride/hexafluoropropylene copolymer, PVDF, polyacrylonitrile, polymethylmethacrylate, and a combination thereof.

Then, an electrolyte is prepared.

In some embodiments, the electrolyte may be an organic electrolyte solution. In some embodiments, the electrolyte may be in a solid phase. Examples of the electrolyte are lithium oxide and lithium oxynitride. Any material suitable for use as a solid electrolyte in the art may be used. In some embodiments, the solid electrolyte may be formed on the anode by, for example, sputtering.

In some embodiments, the organic electrolyte solution may be prepared by dissolving a lithium salt in an organic solvent.

The organic solvent is not limited and may be any suitable organic solvent. In some embodiments, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, N,N-dimethyl formamide, dimethyl acetamide, dimethylsulfoxide, dioxane, 1,2-dimethoxyethane, sulfurane, dichloroethane, chlorobenzene, nitrobenzene, diethylene glycol, dimethyl ether, or a combination thereof.

In some embodiments, the lithium salt may be any material suitable for use as a lithium salt in a lithium secondary battery. In some embodiments, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a combination thereof.

Figure 7:
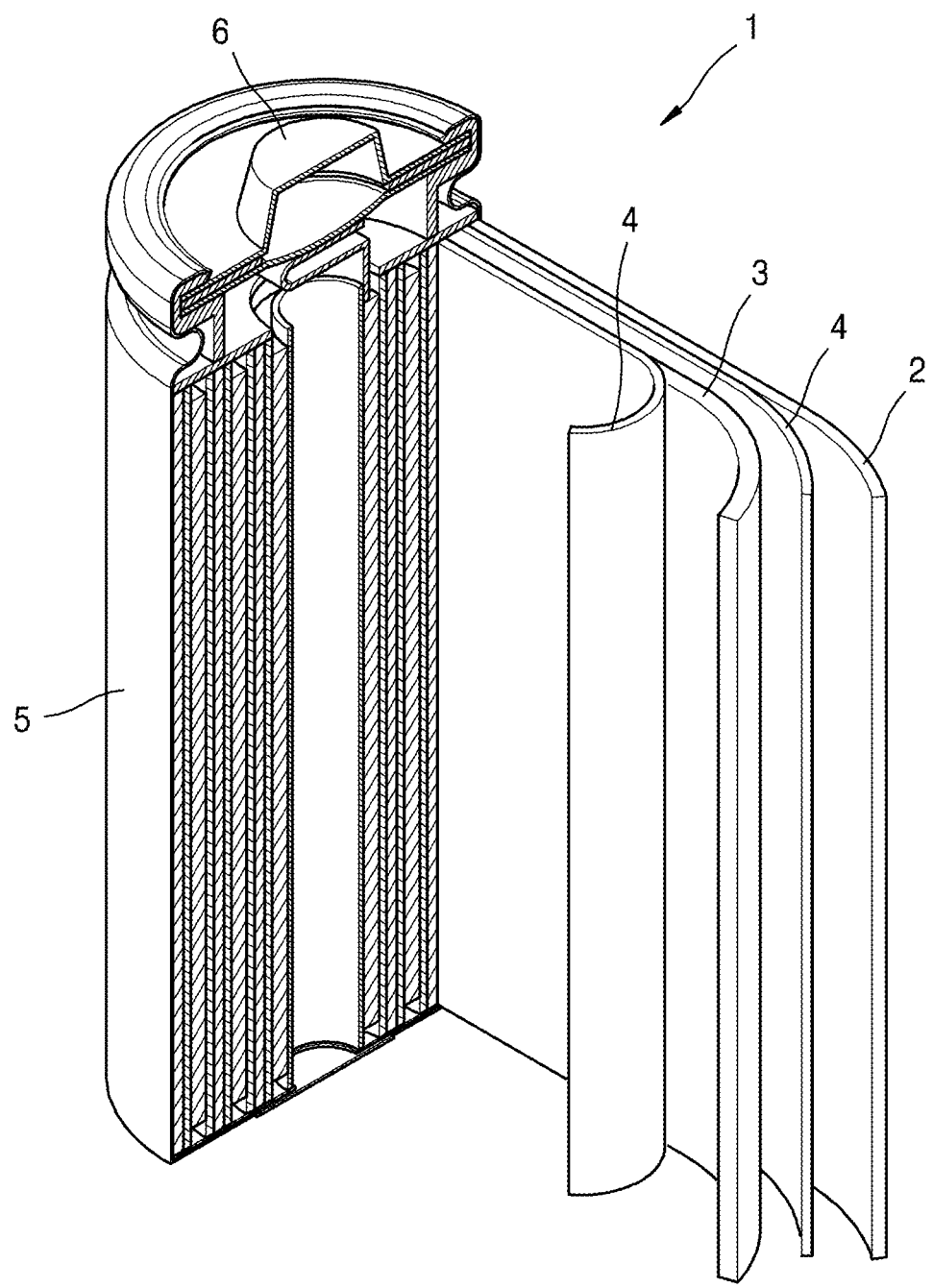
FIG. 7 is a schematic view of a lithium battery according to an embodiment.

Referring to FIG. 7, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a large-sized thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device in which high capacity and high output are desirable, for example, in a laptop computer, a smart phone, or an electric vehicle.

The lithium battery 1 may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

The lithium battery uses an additional charge capacity provided by the composite cathode active material by activating the second layered crystalline phase (e.g., a $Li_2MnO_3$ like phase) that belongs to a C2/m space group included in the second lithium transition metal oxide, which is the coating layer. Activation of the second layered crystalline phase occurs by charging the lithium battery to a relative high voltage of about 4.5 V or greater with respect to a lithium metal during an initial charging process. In this regard, an initial charge/discharge capacity of the lithium battery may improve.

According to another embodiment, a method of preparing a composite cathode active material may include providing a first lithium transition metal oxide represented by Formula 1 and having a first layered crystalline phase that belongs to a R-3m space group; combining the first lithium transition metal oxide, a precursor of a second lithium transition metal oxide, and a lithium source to prepare a mixture; and heat-treating the mixture in an oxidation atmosphere (e.g., including air or oxygen) to obtain a composite cathode active material:

$$Li_aMO_2 \qquad \text{Formula 1}$$

In Formula 1, 1.0≤a≤1.03; and M includes nickel and an element including a Group 4 to a Group 13 element other than nickel. The providing of the first lithium transition metal oxide may include preparing the first lithium transition metal oxide.

In the method of preparing the composite cathode active material, the first lithium transition metal oxide, the precursor of the second transition metal oxide, and the lithium source are combined to prepare a mixture, and the mixture is heat-treated in an oxidation atmosphere to form a coating layer including the second lithium transition metal oxide disposed on a surface of the first lithium transition metal oxide. The coating layer may be arranged in a discontinuous manner on a surface of a particle (i.e., core) of the first lithium transition metal oxide. The second lithium transition metal oxide may be produced on a surface of the first lithium transition metal oxide by using the residual lithium present on surfaces of core particles of the first lithium transition metal oxide as a lithium source. Thus, an amount of the free lithium remaining on a surface of the first lithium transition metal oxide may be reduced as a result of the heat-treatment. Substantially, the second lithium transition metal oxide may be a lithium transition metal oxide that includes a Mn-rich phase or a large amount of lithium. For example, some transition metal sites in the second lithium transition metal oxide may be substituted with lithium.

The first lithium transition metal oxide may be a material having the first layered crystalline phase that belongs to a R-3m space group and may be, for example, a compound represented by Formula 3 or Formula 4. The first lithium transition metal oxide includes nickel and an element including a Group 4 to a Group 13 element other than nickel, and an amount of nickel in the first lithium transition metal oxide may be greater than an amount of the Group 4 to Group 13 element. The amount of nickel may be about 40 mole percent (mol %) or higher, about 50 mol % or higher, about 60 mol % or higher, about 70 mol % or higher, about 80 mol % or higher, or about 85 mol % or higher, based on the total amount of metals other than lithium, included in the first lithium transition metal oxide.

The precursor of the second lithium transition metal oxide may be a metal hydride that includes all of the transition metals of the second lithium transition metal oxide.

For example, the precursor of the second lithium transition metal oxide may be a compound represented by Formula 8.

$$M(OH)_2 \qquad \text{Formula 8}$$

In Formula 8, M includes at least two elements including nickel (Ni), manganese (Mn), vanadium (V), chrome (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof.

For example, the precursor of the second lithium transition metal oxide may be a compound represented by Formula 9.

$$M4_yM5_zMn_w(OH)_2 \quad \text{Formula 9}$$

In Formula 9, $1.07 \leq x \leq 1.20$, $0.1 \leq y < 0.8$, $0 \leq z \leq 0.13$, $0.46 \leq w < 0.8$, and $0.80 \leq y+z+w \leq 0.93$; M4 and M5 each independently include nickel (Ni), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof.

In the method of preparing the composite cathode active material, the lithium source is not particularly limited and may be any compound capable of being used as a lithium source in a lithium battery. For example, the lithium source may be $Li_2CO_3$.

In the method of preparing the composite cathode active material, the combining of the first lithium transition metal oxide, the precursor of the second lithium transition metal oxide, and the lithium source to form a mixture, may be performed using a wet process or a dry process. The wet process may include mixing the first lithium transition metal oxide and the precursor of the second lithium transition metal oxide in a solvent such as alcohol to prepare an alcohol solution and then drying the solvent to prepare a dry mixture. The dry process may include mechanical mixing of the first lithium transition metal oxide and the precursor of the second lithium transition metal oxide in the powder form to prepare a mixture. The dry process may be used in term of convenience in preparation.

In the method of preparing the composite cathode active material, the dry or heat-treat process may be performed in an oxidation atmosphere including air or oxygen at a temperature in a range of about 500° C. to about 800° C. for about 2 hours to about 40 hours, but the conditions are not limited thereto, and may be appropriately controlled within the above ranges in order to provide improved physical properties depending upon the types of metals being used. For example, the heat-treatment process may be performed in an air atmosphere at a temperature in a range of about 600° C. to about 800° C. for about 4 hours to about 30 hours. For example, the heat-treatment process may be performed in an air atmosphere at a temperature in a range of about 700° C. to about 800° C. for about 5 hours to about 20 hours. For example, the heat-treatment process may be performed in an air atmosphere at a temperature in a range of about 700° C. to about 800° C. for about 7 hours to about 15 hours.

In the method of preparing the composite cathode active material, a reactivity associated with the presence of the free lithium is decreased after the heat-treatment, and thus an additional washing process for removing the free lithium to prepare a composite cathode active material may be omitted. Thus, an efficiency of the method of preparing the composite cathode active material may be significantly improved.

In the method of preparing the composite cathode active material, an amount of the precursor of the second lithium transition metal oxide that is combined with the first lithium transition metal oxide may be in a range of about 1 weight percent (wt %) to about 30 wt %, based on the total weight of the mixture. For example, in the method of preparing the composite cathode active material, an amount of the precursor of the second lithium transition metal oxide that is combined with the first lithium transition metal oxide may be in a range of about 2 wt % to about 30 wt % based on the total weight of the mixture. For example, in the method of preparing the composite cathode active material, an amount of the precursor of the second lithium transition metal oxide that is combined with the first lithium transition metal oxide may be in a range of about 3 wt % to about 25 wt % based on the total weight of the mixture. For example, in the method of preparing the composite cathode active material, an amount of the precursor of the second lithium transition metal oxide that is combined with the first lithium transition metal oxide may be in a range of about 5 wt % to about 20 wt % based on the total weight of the mixture. For example, in the method of preparing the composite cathode active material, an amount of the precursor of the second lithium transition metal oxide that is combined with the first lithium transition metal oxide may be in a range of about 7 wt % to about 15 wt % based on the total weight of the mixture. The composite cathode active material having improved physical properties may be manufactured by including the precursor of the second lithium transition metal oxide at an amount within these ranges.

Hereinafter, one or more embodiments will now be described in more detail with reference to the following examples. However, these examples are provided herein for illustrative purpose only and not intended to limit the scope of the one or more embodiments.

EXAMPLES

Preparation of Composite Cathode Active Material (1)

Example 1: Ni-85%+H—OLO $LiNi_{0.85}Co_{0.1}Mn_{0.05}O_2$ as a first lithium transition metal oxide; $Ni_{0.25}Co_{0.1}Mn_{0.65}(OH)_2$ as a second lithium transition metal oxide precursor; and $Li_2CO_3$ as a lithium source were mixed to prepare a mixture.

The second lithium transition metal oxide precursor and the lithium source were mixed at a molar ratio of 1.4:1.0=lithium:transition metals (Ni, Co, and Mn).

The mixture was added to a furnace and heat-treated while flowing air at a temperature of 750° C. for 10 hours to prepare a composite cathode active material that includes 90 parts by weight of $LiNi_{0.85}Co_{0.1}Mn_{0.05}O_2$ having an average particle diameter (D50) of about 14 μm as the first lithium transition metal oxide, and 10 parts by weight of $Li_{1.17}Ni_{0.21}Co_{0.08}Mn_{0.54}O_2$ having an average particle diameter (D50) of about 2 μm as the second lithium transition metal oxide. Further, during the heat-treatment process, since the free lithium such as $Li_2CO_3$ or LiOH remaining on a surface of $LiNi_{0.85}Co_{0.1}Mn_{0.05}O_2$ having an average particle diameter (D50) of about 14 μm reacted with the second lithium transition metal oxide precursor, $Ni_{0.25}Co_{0.1}Mn_{0.65}(OH)_2$, the $LiNi_{0.85}Co_{0.1}Mn_{0.05}O_2$ of the composite cathode active material was coated with $Li_{1.17}Ni_{0.21}Co_{0.08}Mn_{0.54}O_2$. That is, the composite cathode active material included: a large diameter cathode active material having a $LiNi_{0.85}Co_{0.1}Mn_{0.05}O_2$ core and a $Li_{1.17}Ni_{0.21}Co_{0.08}Mn_{0.54}O_2$ coating layer disposed on the $LiNi_{0.85}Co_{0.1}Mn_{0.05}O_2$ core; and a small diameter cathode active material having $Li_{1.17}Ni_{0.21}Co_{0.08}Mn_{0.54}O_2$.

Therefore, the prepared composite cathode active material included a large-diameter $LiNi_{0.85}Co_{0.1}Mn_{0.05}O_2$ having an average particle diameter (D50) of about 14 μm and a small-diameter $Li_{1.17}Ni_{0.21}Co_{0.08}Mn_{0.54}O_2$ having an average particle diameter (D50) of about 2 μm, which were mixed at a weight ratio of about 90:10, wherein the large-diameter $LiNi_{0.85}Co_{0.1}Mn_{0.05}O_2$ had a $Li_{1.17}Ni_{0.21}Co_{0.08}Mn_{0.54}O_2$ coating layer formed on a surface of a large-diameter $LiNi_{0.85}Co_{0.1}Mn_{0.05}O_2$ core. As shown in FIG. 1, the $Li_{1.17}Ni_{0.21}Co_{0.08}Mn_{0.54}O_2$ coating layer was disposed in a sea-island shape on a surface of the large-diameter $LiNi_{0.85}Co_{0.1}Mn_{0.05}O_2$ core, and thus was a discontinuous coating layer.

Example 2: Ni-88%+H-OLO

A composite cathode active material was prepared in the same manner as in Example 1, except that a composition of the first lithium transition metal oxide was changed to $LiNi_{0.88}Co_{0.08}Mn_{0.04}O_2$ from $LiNi_{0.85}Co_{0.1}Mn_{0.05}O_2$.

The prepared composite cathode active material included a large-diameter $LiNi_{0.88}Co_{0.08}Mn_{0.04}O_2$ having an average particle diameter (D50) of about 14 μm and a small-diameter $Li_{1.17}Ni_{0.21}Co_{0.08}Mn_{0.54}O_2$ having an average particle diameter (D50) of about 2 μm, which were mixed at a weight ratio of about 90:10, wherein the large-diameter $LiNi_{0.85}Co_{0.1}Mn_{0.05}O_2$ had a $Li_{1.17}Ni_{0.21}Co_{0.08}Mn_{0.54}O_2$ coating layer formed on a surface of a large-diameter $LiNi_{0.88}Co_{0.08}Mn_{0.04}O_2$ core.

Example 3: Large-Diameter:Small-Diameter=8:2

A composite cathode active material was prepared in the same manner as in Example 1, except that a mixing ratio of the large-diameter $LiNi_{0.88}Co_{0.08}Mn_{0.04}O_2$ having an average particle diameter (D50) of about 14 μm and $Li_{1.17}Ni_{0.21}Co_{0.08}Mn_{0.54}O_2$ having an average particle diameter (D50) of about 2 μm were mixed at a weight ratio of about 80:20.

The prepared composite cathode active material included a large-diameter $LiNi_{0.88}Co_{0.08}Mn_{0.04}O_2$ having an average particle diameter (D50) of about 14 μm and the small-diameter $Li_{1.17}Ni_{0.21}Co_{0.08}Mn_{0.54}O_2$ having an average particle diameter (D50) of about 2 μm, which were mixed at a weight ratio of about 80:20, wherein the large-diameter $LiNi_{0.85}Co_{0.1}Mn_{0.05}O_2$ had a $Li_{1.17}Ni_{0.21}Co_{0.08}Mn_{0.54}O_2$ coating layer formed on a surface of a large-diameter $LiNi_{0.88}Co_{0.08}Mn_{0.04}O_2$ core.

Comparative Example 1: Ni-85% Alone $LiNi_{0.85}Co_{0.1}Mn_{0.05}O_2$ as a lithium transition metal oxide was added to a furnace and was heat-treated while flowing air at a temperature of 750° C. for 10 hours, and $LiNi_{0.85}Co_{0.1}Mn_{0.05}O_2$ having an average particle diameter (D50) of about 14 μm was used a composite cathode active material.

Comparative Example 2: Ni-91% Alone $LiNi_{0.91}Co_{0.06}Mn_{0.03}O_2$ as a lithium transition metal oxide was added to a furnace and was heat-treated while flowing air at a temperature of 750° C. for 10 hours, and $LiNi_{0.91}Co_{0.06}Mn_{0.03}O_2$ having an average particle diameter (D50) of about 14 μm was used a composite cathode active material.

Comparative Example 3: H-OLO Alone $Ni_{0.25}Co_{0.1}Mn_{0.65}(OH)_2$ as a lithium transition metal oxide precursor and $Li_2CO_3$ as a lithium source were mixed at a predetermined ratio so that $Li_{1.17}Ni_{0.21}Co_{0.08}Mn_{0.54}O_2$ was obtained as a lithium transition metal oxide.

The second lithium transition metal oxide precursor and the lithium source were mixed so that a molar ratio of lithium:transition metals (Ni, Co, and Mn) was 1.4:1.

The mixture was added to a furnace and was heat-treated while flowing air at a temperature of 750° C. for 10 hours, and thus $Li_{1.17}Ni_{0.21}Co_{0.08}Mn_{0.54}O_2$ having an average particle diameter (D50) of about 2 μm was used a composite cathode active material.

Preparation of Lithium Battery (Half Cell)

Preparation of Cathode

Example 4

The composite cathode active material prepared in Example 1, a carbon conducting material (Denka Black), and polyvinylidene fluoride (PVdF) were mixed at a weight ratio of 92:4:4 to prepare a mixture, and the mixture was mixed with N-methylpyrrolidone (NMP) in an agate mortar to prepare a slurry. The slurry was bar coated on an aluminum current collector having a thickness of 15 μm dried at room temperature, dried once more in vacuum at 120° C., and then roll-pressed and punched to prepare a cathode plate having a thickness of 55 μm. A packing density of the cathode active material was shown in Table 4. A loading level of the cathode active material was 10.0 mg/cm².

Preparation of Coin Cell

The cathode plate thus prepared, a lithium metal as a counter electrode, a PTFE separator, and a solution prepared by dissolving 1.15 M of $LiPF_6$ in ethylene carbonate (EC)+ethylmethyl carbonate (EMC)+dimethyl carbonate (DMC) at a volume ratio of 3:4:3 as an electrolyte were used to prepare a coin cell.

Examples 5 and 6

Coin cells were prepared in the same manner as in Example 4, except that the composite cathode active materials prepared in Examples 2 and 3 were used instead of the composite cathode active material prepared in Example 1.

Comparative Examples 4 to 6

Coin cells were prepared in the same manner as in Example 4, except that the composite cathode active materials prepared in Comparative Examples 1 to 3 were used instead of the composite cathode active material prepared in Example 1.

Evaluation Example 1: Evaluation of Packing Density 3.0 g of each of the composite cathode active materials prepared in Example 1, Example 3, Comparative Example 1, and Comparative Example 3 was dried at 80° C., and then a press density of the composite cathode active material was measured after pressing the resultant at a pressure of 2.6 tons/cm² for 30 seconds. The results are shown in Table 1.

TABLE 1

|  | Press density [g/cc] |
| --- | --- |
| Example 1 | 3.38 |
| Example 3 | 3.29 |
| Comparative Example 1 | 2.99 |
| Comparative Example 3 | 2.69 |

As shown in Table 1, the composite cathode active material of each of the Examples included both a large-diameter active material and a small-diameter active material and thus had an increased press density as compared to the press density of Comparative Example 1 including only a large-diameter active material and Comparative Example 3 including only a small-diameter active material.

Therefore, the composite cathode active materials of the Examples may provide a relatively higher energy density per unit volume.

Evaluation Example 2: Evaluation of Amount of Free Lithium

Amounts of free lithium with respect to the composite cathode active materials prepared in Example 1, Example 3, Comparative Example 1, and Comparative Example 3 were measured by titration, and the results are shown in Table 2.

TABLE 2

|  | Amount of free lithium (Amounts of Li in LiCO$_3$ & LiOH) [ppm] |
| --- | --- |
| Example 1 | 1,175 |
| Example 3 | 1,685 |
| Comparative Example 1 | 2,521 |
| Comparative Example 3 | 632 |

As shown in Table 2, the composite cathode active materials prepared in Examples 1 and 3 had significantly decreased amounts of free lithium compared to that of the lithium transition metal oxide of Comparative Example 1.

Evaluation Example 3: Differential Scanning Calorimeter (DSC) Evaluation

Figure 2:
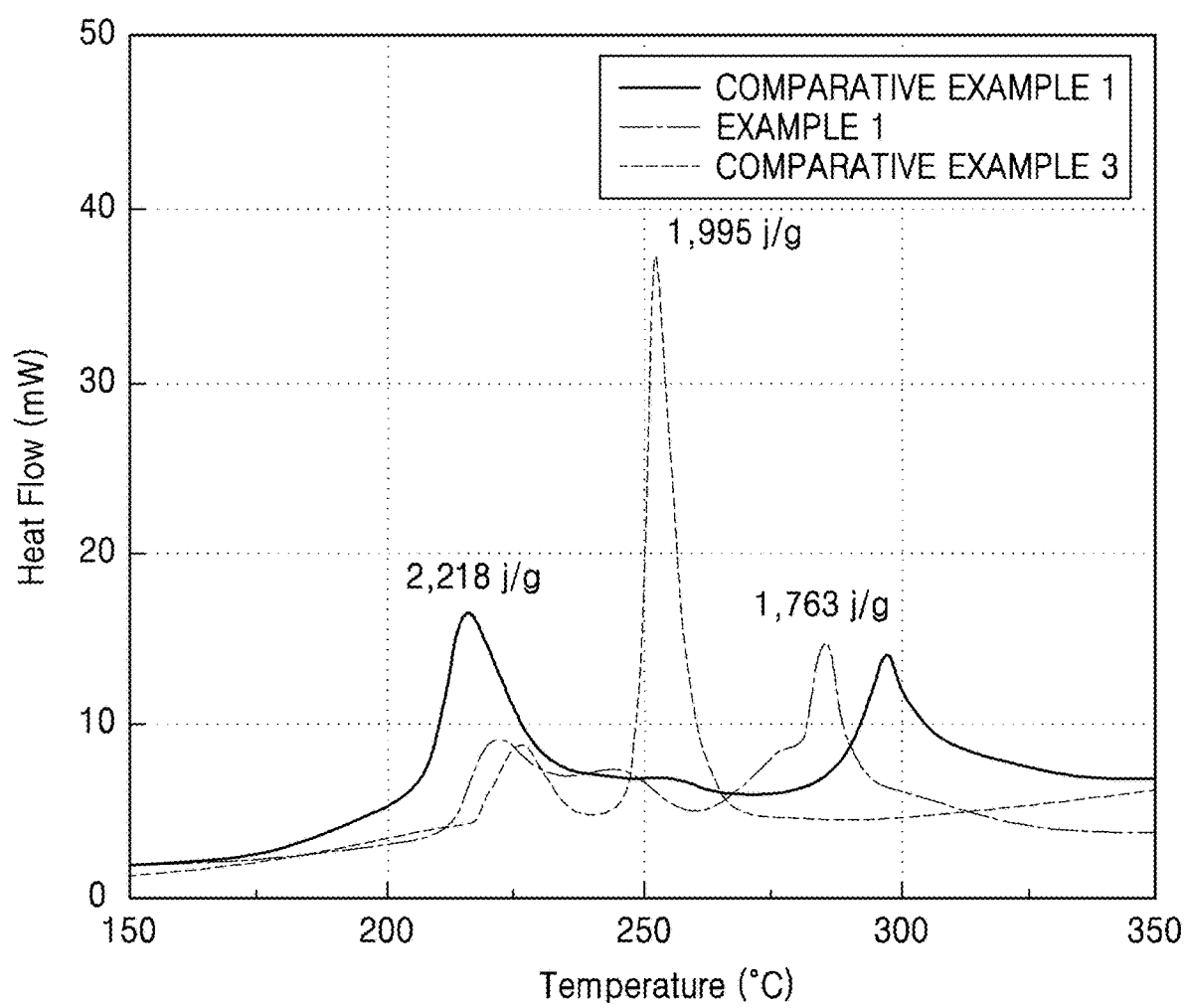
FIG. 2 is a graph of heat flow (milliwatts, mW) versus temperature (degrees Celsius, ° C.), showing the differential scanning calorimetry (DSC) profile of composite cathode active materials prepared in Example 1 and Comparative Examples 1 and 3.

Thermal stability of the composite cathode active materials prepared in Example 1 and Comparative Examples 1 and 3 were evaluated by differential scanning calorimeter (DSC), and the results are shown in FIG. 2.

As shown in FIG. 2, it was confirmed that the composite cathode active material of Example 1 had improved thermal stability as compared to the composite cathode active materials of Comparative Examples 1 and 3 as a calorific value decreased.

Evaluation Example 4: Charging/Discharging Characteristics Evaluation

At 25° C., the lithium battery prepared in Comparative Example 4 was charged with a constant current (CC) of 0.1 C rate until the voltage was 4.5 V (vs. Li), and the current was cut-off at 0.05 C rate while the voltage was maintained at 4.5 V in a constant voltage mode (CV). Then, the battery was discharged with a constant current (CC) of 0.1 C rate until the voltage of the discharge was 2.8 V (vs. Li) (1$^{st}$ formation cycle).

At 25° C., the lithium battery underwent the 1$^{st}$ cycle was charged with a constant current of 0.1 C rate until a voltage was 4.5 (vs. Li), and the current was cut-off at a 0.05 C rate while the voltage was maintained at 4.5 V in a CV mode. Then, the battery was discharged with a constant current of 0.1 C rate until a voltage of the discharge was 2.8 V (vs. Li) (2$^{nd}$ formation cycle).

At 25° C., the lithium battery underwent the 2$^{nd}$ cycle was charged with a constant current of 0.5 C rate until a voltage was 4.5 (vs. Li), and the current was cut-off at a 0.05 C rate while the voltage was maintained at 4.5 V in a CV mode. Then, the battery was discharged with a constant current of 0.2 C rate until a voltage of the discharge was 2.8 V (vs. Li) (0.2D cycle, 3$^{rd}$ cycle).

At 25° C., the lithium battery underwent the 0.2D cycle was charged with a constant current of 0.5 C rate until a voltage was 4.5 (vs. Li), and the current was cut-off at a 0.05 C rate while the voltage was maintained at 4.5 V in a CV mode. Then, the battery was discharged with a constant current of 0.33 C rate until a voltage of the discharge was 2.8 V (vs. Li) (0.33D cycle, 4$^{th}$ cycle).

At 25° C., the lithium battery underwent the 0.33D cycle was charged with a constant current of 0.5 C rate until a voltage was 4.5 (vs. Li), and the current was cut-off at a 0.05 C rate while the voltage was maintained at 4.5 V in a CV mode. Then, the battery was discharged with a constant current of 1.0 C rate until a voltage of the discharge was 2.8 V (vs. Li) (1D cycle, 5$^{th}$ cycle).

At 25° C., the lithium battery underwent the 1D cycle was charged with a constant current of 0.5 C rate until a voltage was 4.5 (vs. Li), and the current was cut-off at a 0.05 C rate while the voltage was maintained at 4.5 V in a CV mode. Then, the battery was discharged with a constant current of 2.0 C rate until a voltage of the discharge was 2.8 V (vs. Li) (2D cycle, 6$^{th}$ cycle).

At 25° C., the lithium battery underwent the 2D cycle was charged with a constant current of 0.5 C rate until a voltage was 4.5 (vs. Li), and the current was cut-off at a 0.05 C rate while the voltage was maintained at 4.5 V in a CV mode. Then, the battery was discharged with a constant current of 3.0 C rate until a voltage of the discharge was 2.8 V (vs. Li) (3D cycle, 7$^{th}$ cycle).

At 25° C., the lithium battery underwent the 3D cycle was charged with a constant current of 1.0 C rate until a voltage was 4.35 V (vs. Li), and the current was cut-off at a 0.05 C rate while the voltage was maintained at 4.5 V in a CV mode. Then, the battery was discharged with a constant current of 1.0 C rate until a voltage of the discharge was 2.8 V (vs. Li). The cycle was repeated until 48$^{th}$ cycle.

In the whole charge/discharge cycles, there was 10 minutes of a resting period after every charge/discharge cycle.

The lithium battery prepared in Comparative Example 5 was charged/discharged in the same manner as in the lithium battery prepared in Comparative Example 4 from the 1$^{st}$ cycle to the 48$^{th}$ cycle, except that the charge voltage was changed from 4.5 V to 4.35 V.

The lithium battery prepared in Comparative Example 6 was charged/discharged in the same manner as in the lithium battery prepared in Comparative Example 4, except that the charge voltage was changed from 4.5 V to 4.7 V at the 1$^{st}$ cycle, and the charge voltage was changed from 4.5 V to 4.6 V from the 2$^{nd}$ cycle to the 48$^{th}$ cycle.

The lithium batteries prepared in Examples 4 to 6 were charged/discharged in the same manner as in the lithium battery prepared in Comparative Example 4, except that the charge voltage was changed from 4.5 V to 4.7 V at the 1$^{st}$ cycle, and the charge voltage was changed from 4.5 V to 4.35 V from the $2^{nd}$ cycle to the $48^{th}$ cycle.

Figure 3:
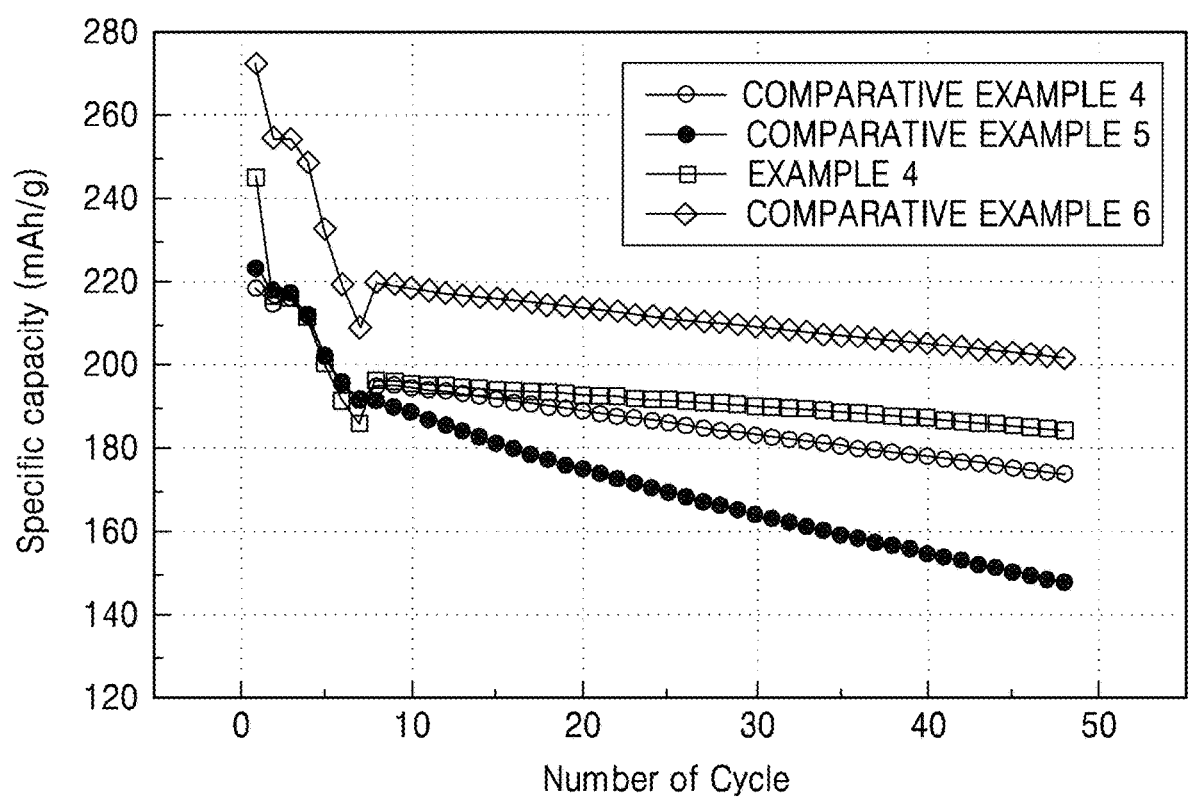
FIG. 3 is a graph of specific capacity (milliampere hours per gram, mAh/g) versus cycle number, showing the lifespan characteristics of the lithium batteries prepared in Example 4 and Comparative Examples 4 to 6.

Some of the results of the charge/discharge test are shown in Table 3 and in FIG. 3. Capacity retention ratios and initial charge/discharge efficiencies at the $48^{th}$ cycle are defined according to Equations 1 and 2.

Capacity retention ratio [%]=[Discharge capacity at the $48^{th}$ cycle/discharge capacity at the $8^{th}$ cycle]×100%   Equation 1

Initial efficiency [%]=[Discharge capacity at the $1^{st}$ cycle/charge capacity at the $1^{st}$ cycle]×100%   Equation 2

A voltage drop (ΔV) was a difference between an average voltage at the $1^{st}$ cycle and an average voltage at the $48^{th}$ cycle. The average voltage is a voltage at 50% of state of charge (SOC).

Figure 4A:
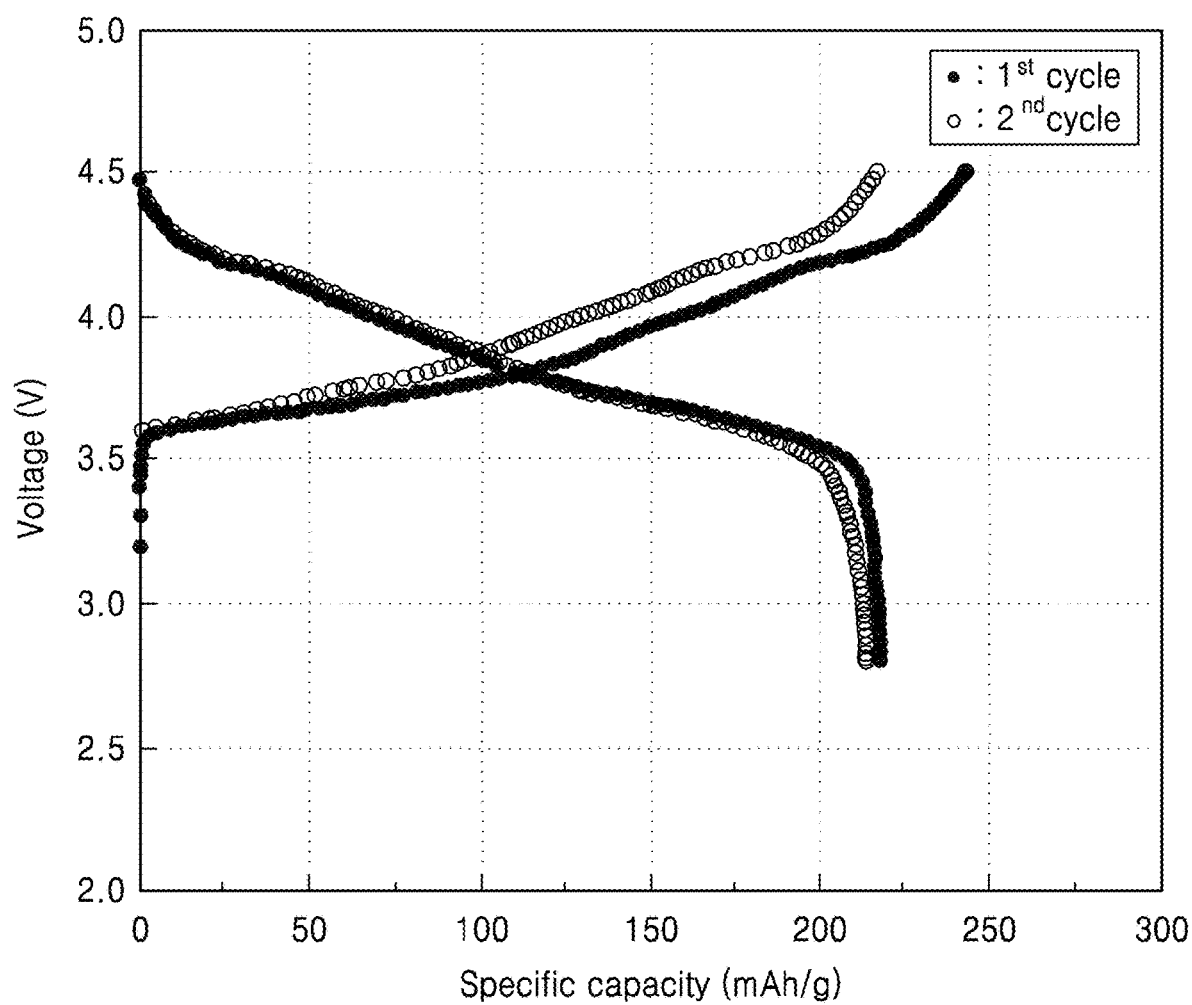
FIG. 4A is a graph of voltage (V) versus specific capacity (mAh/g), showing the charge/discharge profile of the first and second cycles in the lithium battery prepared in Comparative Example 4.
Figure 4B:
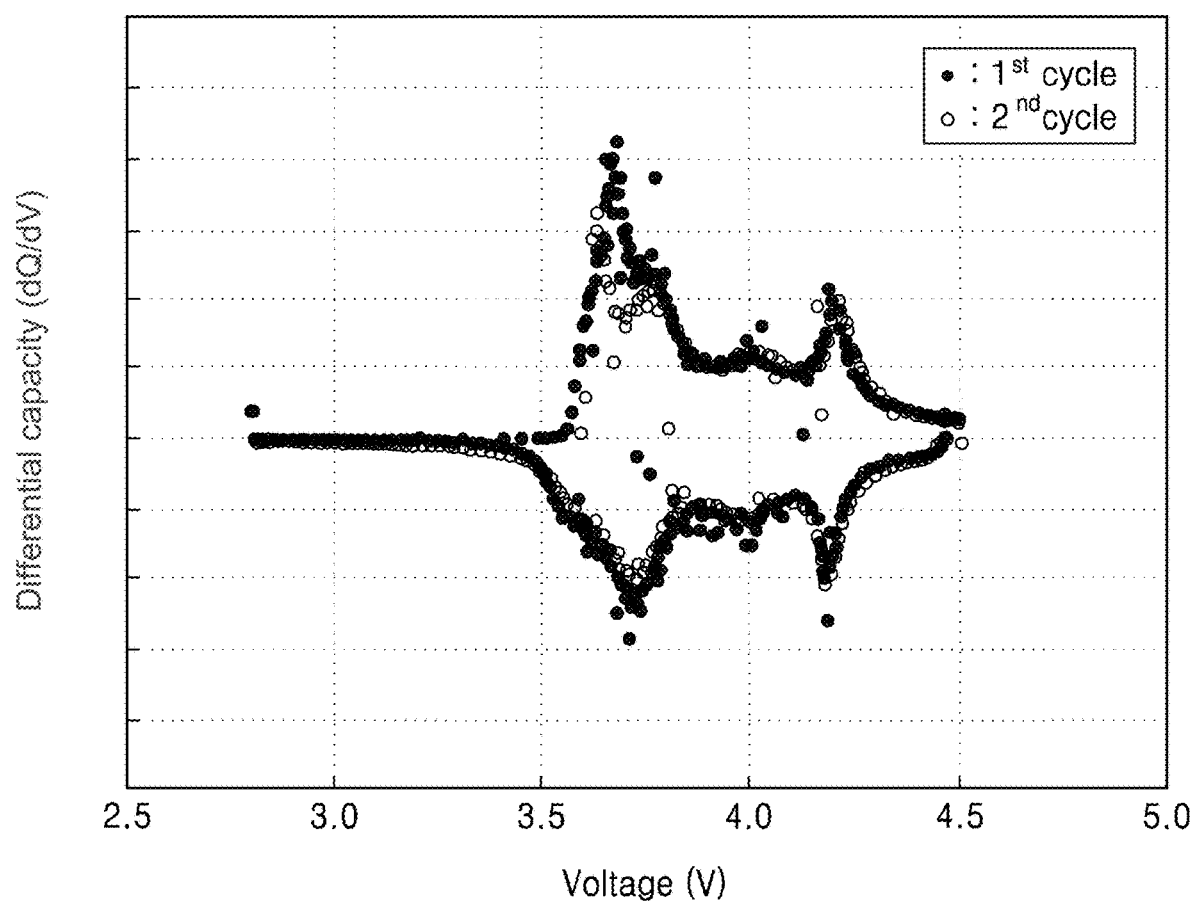
FIG. 4B is a graph of differential capacity (dQ/dV) versus voltage (V), illustrating the results of a differential capacity analysis based on FIG. 4A.

Also, charge/discharge profiles of the $1^{st}$ and $2^{nd}$ cycles of the lithium battery of Comparative Example 4 and their conversions into differential capacity (dQ/dV) vs. voltage (V) are each respectively shown in FIGS. 4A and 4B.

Figure 5A:
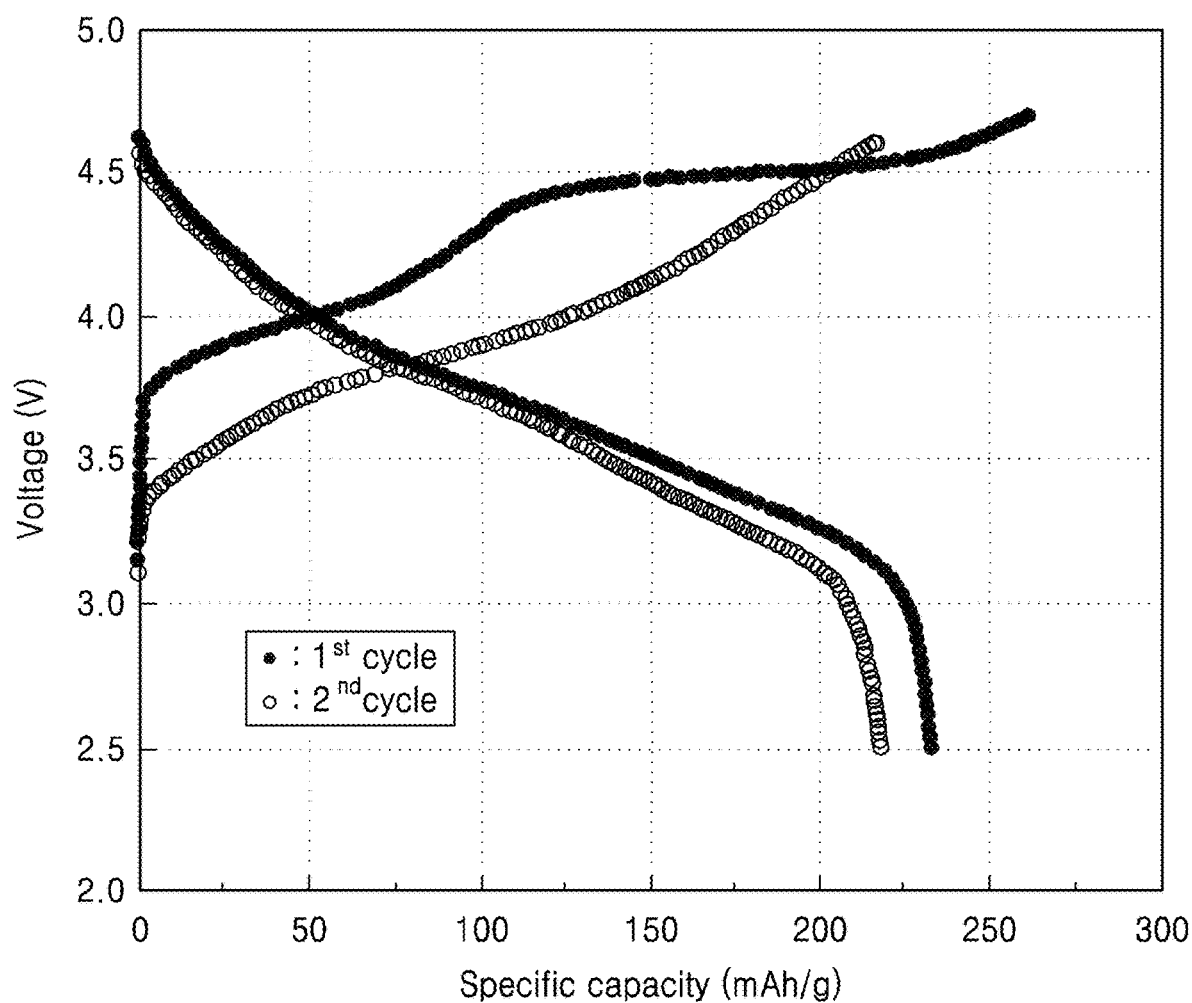
FIG. 5A is a graph of voltage (V) versus specific capacity (mAh/g), showing the charge/discharge profile of the first and second cycles in the lithium battery prepared in Comparative Example 6.
Figure 5B:
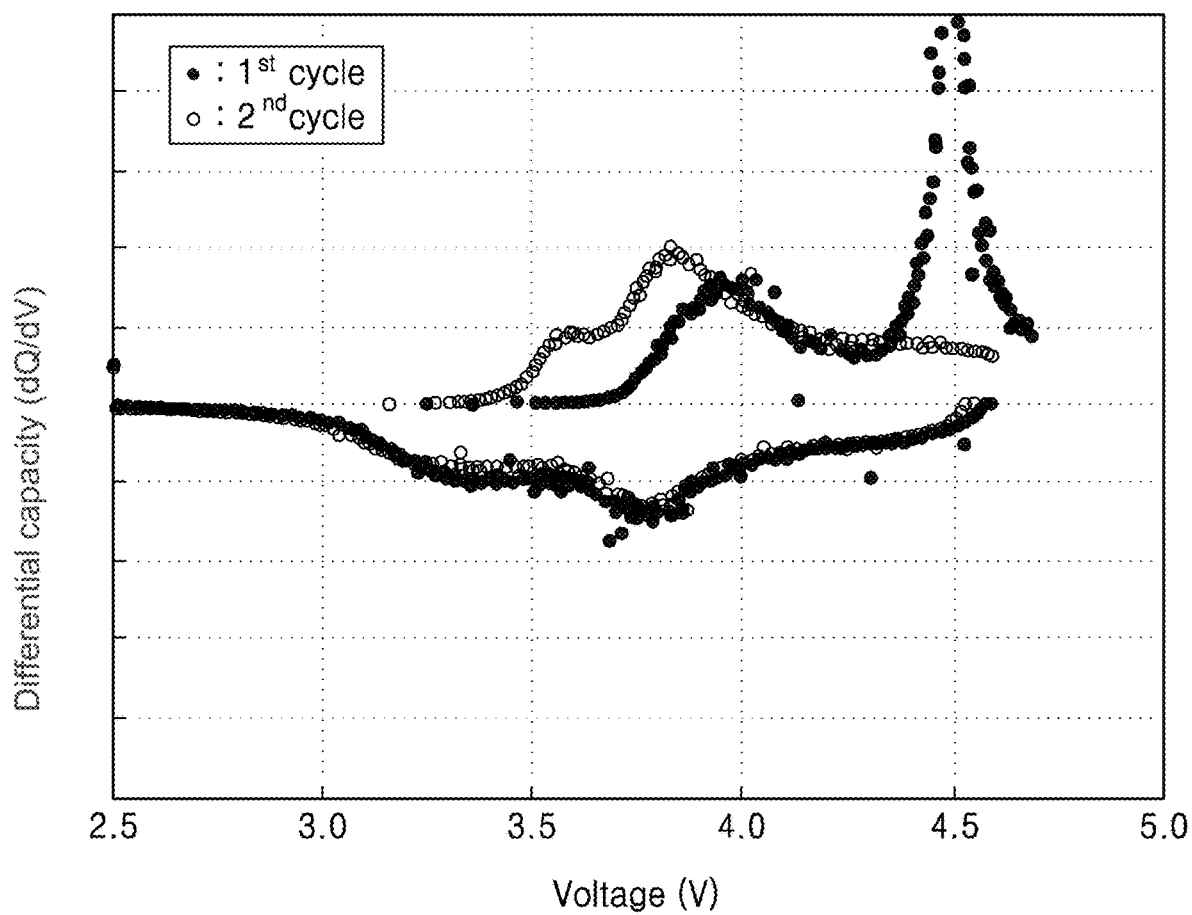
FIG. 5B is a graph of differential capacity (dQ/dV) versus voltage (V), illustrating the results of differential capacity analysis based on FIG.

Also, charge/discharge profiles of the $1^{st}$ and $2^{nd}$ cycles of the lithium battery of Comparative Example 6 and their conversions into dQ/dV vs. voltage (V) are each respectively shown in FIGS. 5A and 5B.

Figure 6A:
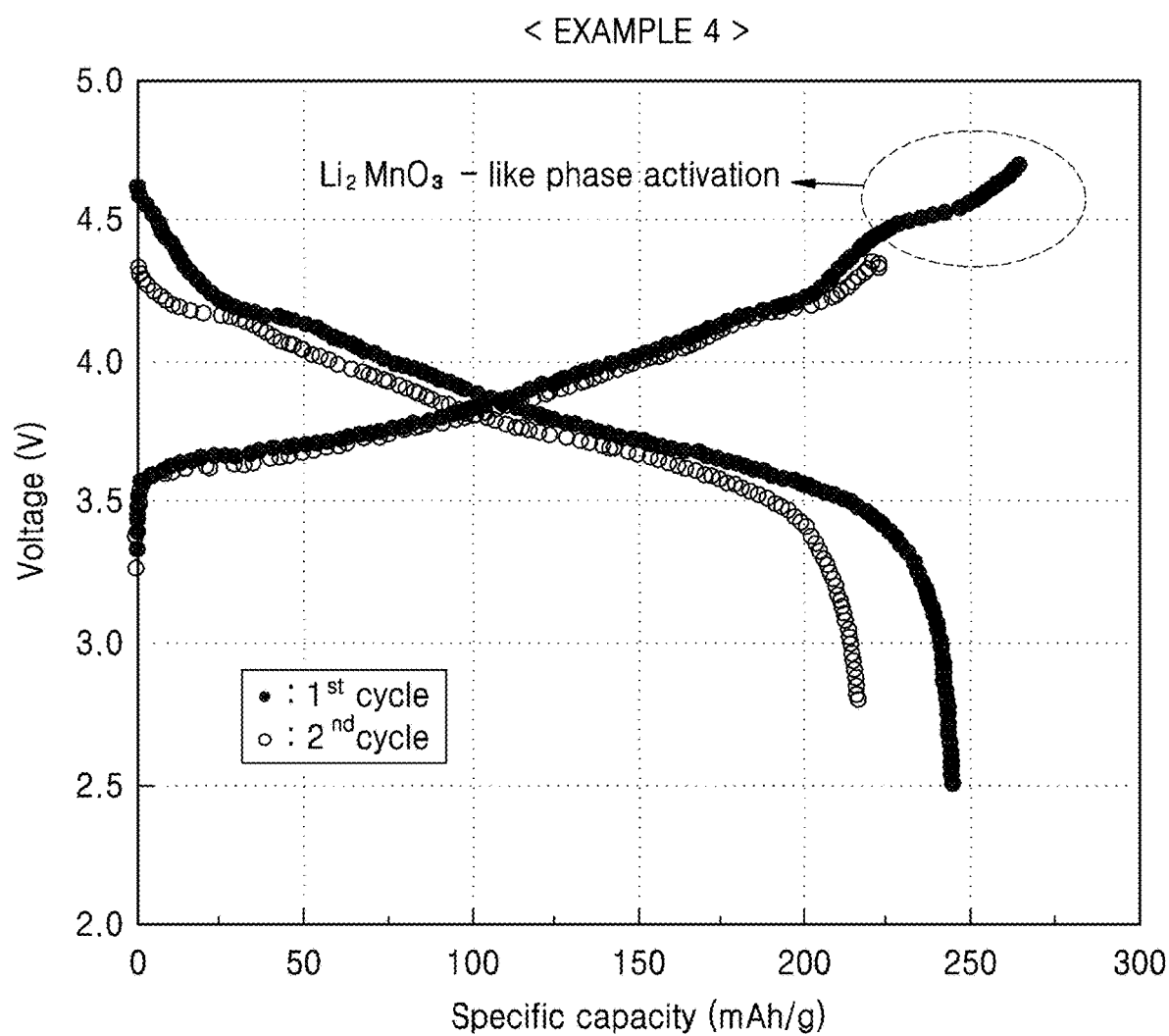
FIG. 6A is a graph of voltage (V) versus specific capacity (mAh/g) showing the charge/discharge profile of the first and second cycles in the lithium battery prepared in Example 4.
Figure 6B:
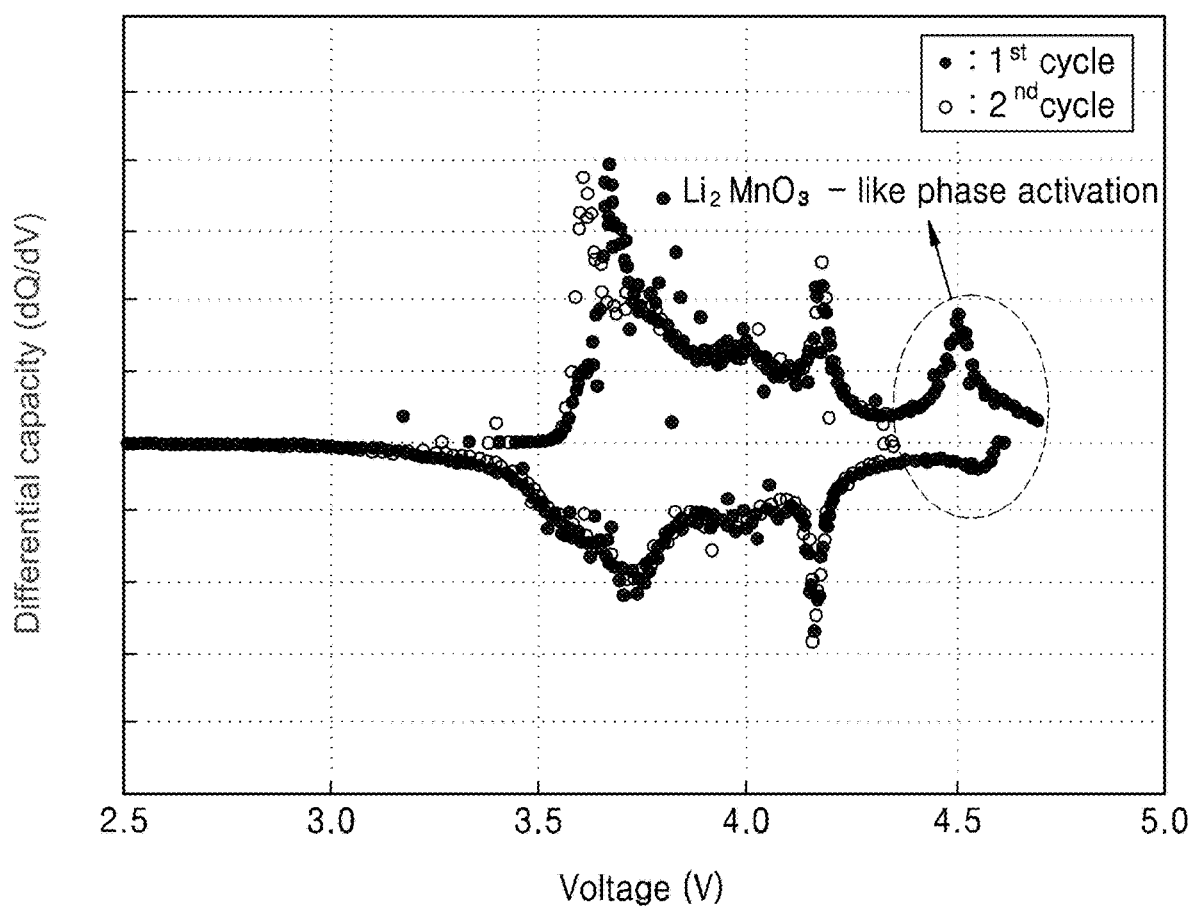
FIG. 6B is a graph of differential capacity (dQ/dV) versus voltage (V), illustrating the results of differential capacity analysis based on FIG. 6A.

Also, charge/discharge profiles of the $1^{st}$ and $2^{nd}$ cycles of the lithium battery of Example 4 and their conversions into dQ/dV vs. voltage (V) are each respectively shown in FIGS. 6A and 6B.

TABLE 3

| | Discharge capacity at $3^{rd}$ cycle [mAh/g] | Initial efficiency [%] | Capacity retention ratio [%] | Voltage drop (ΔV) [mV] |
|---|---|---|---|---|
| Example 4 | 215 | 92 | 93.8 | 35 |
| Example 5 | 218 | 92 | 92.5 | 41 |
| Example 6 | 199 | 92 | 94.1 | 25 |
| Comparative Example 4 | 216 | 90 | 89.2 | 62 |
| Comparative Example 5 | 217 | 92 | 77.3 | 100 |
| Comparative Example 6 | 254 | 90 | 91.6 | 85 |

As shown in Table 3 and FIG. 3, the lithium battery of Comparative Example 4 including the large-diameter cathode active material having a nickel content of 85%, needed a charging process up to 4.5 V to achieve a discharge capacity of 200 mAh/g at the $3^{rd}$ cycle after the formation process, and accordingly the initial efficiency and the lifespan characteristics of the battery were deteriorated. Also, the lithium battery of Comparative Example 4 had a significant voltage drop during a charge/discharge process from the $8^{th}$ cycle until the $48^{th}$ cycle.

The lithium battery of Comparative Example 5 including the large-diameter cathode active material having a nickel content of 91% had an increased capacity, and thus a discharge capacity of 200 mAh/g was achieved even when charged up to 4.35 V at the $3^{rd}$ cycle after the formation process, but the lifespan characteristics were deteriorated as the Ni content increased. Also, the lithium battery of Comparative Example 5 had a further significant voltage drop during a charge/discharge process from the $8^{th}$ cycle until the $48^{th}$ cycle.

The lithium battery of Comparative Example 6 including the small-diameter cathode active material containing a large amount of lithium may use a charge in the region of 4.5 V or greater, and thus the battery may be charged up to 4.7 V at the $1^{st}$ cycle and charged up to 4.6 V from the $2^{nd}$ cycle, and thus a high discharge capacity of 250 mAh/g was obtained at the $3^{rd}$ cycle and the lifespan characteristics were good. However, the lithium battery of Comparative Example 6 had a significant voltage drop during a charge/discharge process from the $8^{th}$ cycle until the $48^{th}$ cycle.

On the other hand, the lithium battery of Example 4 including the large-diameter cathode active material having a nickel content of 85% and the small-diameter cathode active material containing a large amount of lithium used a charge in the region of 4.5 V or greater of the cathode active material, and thus the battery obtained a high discharge capacity of 200 mAh/g at the $3^{rd}$ cycle and maintained excellent initial efficiency and lifespan characteristics even when the battery was charged up to 4.7 V at the $1^{st}$ cycle and charged up to 4.35 V from the $2^{nd}$ cycle. Also, the lithium battery of Example 4 had a voltage drop that slightly decreased during a charge/discharge process from the $8^{th}$ cycle until the $48^{th}$ cycle.

The lithium batteries of Examples 5 and 6 had excellent charge/discharge characteristics.

Also, as shown in FIG. 6A, an additional charge capacity was observed as a $Li_2MnO_3$ phase in the lithium battery of Example 4 were activated at a voltage of 4.5 V or greater according to a charge process up to 4.7 V at the $1^{st}$ cycle. In FIG. 6A, this was confirmed by a plateau period that occurred at a voltage of 4.5 V or greater. For clarification, the charge/discharge profile of FIG. 6A was converted into a derivative of charge (Q) with respect to voltage (V) (dQ/dV) vs. voltage (V), and the result is shown in FIG. 6B. As shown in FIG. 6B, a peak derived from an additional capacity according to activation of a $Li_2MnO_3$ phase was at a voltage of 4.5 V or greater was confirmed.

The lithium battery of Comparative Example 4 did not include a $Li_2MnO_3$ phase and thus did not have the peak in FIG. 4B.

The lithium battery of Comparative Example 6 had a high content of a $Li_2MnO_3$ phase and thus had the large peak in FIG. 5B.

As described above, according to one or more embodiment, charge/discharge characteristics of a lithium battery may improve and gas generation may be suppressed when a composite cathode active material includes a second metal oxide having a composite crystalline structure on a surface of the composite cathode active material and/or in the composite cathode active material.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising a first cathode active material comprising:
   a core comprising a first lithium transition metal oxide represented by Formula 3 and having a first layered crystalline phase that belongs to a R-3m space group;
   a coating layer disposed on the core and comprising a second lithium transition metal oxide having a plurality of layered crystalline phases, in which each layered crystalline phase of the plurality of layered crystalline phases has a different composition $$Li_aNi_bCo_cMn_dO_2 \quad \text{Formula 3}$$

wherein, in Formula 3, 1.0≤a≤1.03, 0.4<b<1.0, 0<c<0.3, 0<d<0.4, and b+c+d=1; and a residual lithium compound on a surface of the composite cathode active material, wherein an amount of the residual lithium compound on the surface of the composite cathode active material is 632 parts per million to 1500 parts per million, based on a total content of the composite cathode active material.

2. The composite cathode active material of claim 1, wherein the plurality of layered crystalline phases comprises
a second layered crystalline phase that belongs to a C2/m space group; and
a third layered crystalline phase that belongs to a R-3m space group.

3. The composite cathode active material of claim 2, wherein the second layered crystalline phase has a composition represented by Formula 4:

$$Li_2MnO_3. \quad \text{Formula 4}$$

4. The composite cathode active material of claim 3, the third layered crystalline phase has a composition represented by Formula 5:

$$LiMO_2 \quad \text{Formula 5}$$

wherein, in Formula 5, M comprises at least two elements comprising nickel, manganese, vanadium, chromium, iron, cobalt, zirconium, rhenium, aluminum, boron, germanium, ruthenium, tin, titanium, niobium, molybdenum, platinum, or a combination thereof.

5. The composite cathode active material of claim 1, wherein the second lithium transition metal oxide is represented by Formula 6:

$$aLi_2MnO_3 \cdot (1-a)LiMO_2 \quad \text{Formula 6}$$

wherein, in Formula 6,
0.2<a<1; and
M comprises at least two elements comprising nickel, manganese, vanadium, chromium, iron, cobalt, zirconium, rhenium, aluminum, boron, germanium, ruthenium, tin, titanium, niobium, molybdenum, platinum, or a combination thereof.

6. The composite cathode active material of claim 1, wherein the second lithium transition metal oxide is represented by Formula 7:

$$Li_xM4_yM5_zMn_wO_2 \quad \text{Formula 7}$$

wherein, in Formula 7,
1.07≤x≤1.20, 0.1≤y<0.8, 0≤z≤0.13, 0.46≤w<0.8, and 0.80≤y+z+w≤0.93; and
M4 and M5 each independently comprise nickel, vanadium, chromium, iron, cobalt, zirconium, rhenium, aluminum, boron, germanium, ruthenium, tin, titanium, niobium, molybdenum, platinum, or a combination thereof.

7. The composite cathode active material of claim 1, wherein the coating layer comprising the second lithium transition metal oxide is a discontinuous coating on a surface of the core.

8. The composite cathode active material of claim 1, wherein an average particle diameter of the first cathode active material is in a range of about 10 micrometers to about 20 micrometers.

9. The composite cathode active material of claim 1 further comprising a second cathode active material having an average particle diameter of about 5 micrometers or less.

10. The composite cathode active material of claim 9, wherein the second cathode active material comprises the second lithium transition metal oxide having an average particle diameter in a range of about 1 micrometer to about 5 micrometers.

11. The composite cathode active material of claim 9, wherein an amount of the second cathode active material is in a range of about 1 weight percent to about 30 weight percent, based on a total weight of the composite cathode active material.

12. The composite cathode active material of claim 1, wherein the composite active material has a press density of about 3 grams per cubic centimeter or greater after pressing at a pressure of 2.6 tons/cm' for 30 seconds.

13. A cathode comprising:
a current collector; and
the composite cathode active material of claim 1 on the current collector.

14. A lithium battery comprising:
the cathode of claim 13;
an anode; and
a separator between the cathode and the anode.

15. The lithium battery of claim 13, wherein the lithium battery is configured to be charged to a voltage of about 4.5 volts or greater with respect to a lithium metal.

16. The composite cathode active material of claim 1, wherein the amount of the residual lithium compound on the surface of the composite cathode active material is 1175 parts per million to 1500 parts per million, based on the total content of the composite cathode active material.

17. A method of preparing a composite cathode active material, the method comprising:
providing a first lithium transition metal oxide represented by Formula 3 and having a first layered crystalline phase that belongs to a R-3m space group;
combining the first lithium transition metal oxide, a precursor of a second lithium transition metal oxide, and a lithium source to prepare a mixture;
heat-treating the mixture in an oxidation atmosphere to obtain a composite cathode active material $$Li_aNi_bCo_cMn_dO_2 \quad \text{Formula 3}$$

wherein, in Formula 3,
1.0≤a≤1.03, 0.4<b<1.0, 0<c<0.3, and 0<d<1.0.4; and
a residual lithium compound on a surface of the composite cathode active material
wherein an amount of the residual lithium compound on the surface of the composite cathode active material is 632 parts per million to 1500 parts per million, based on a total content of the composite cathode active material.

* * * * *